UNITED STATES PATENT OFFICE 2,640,851

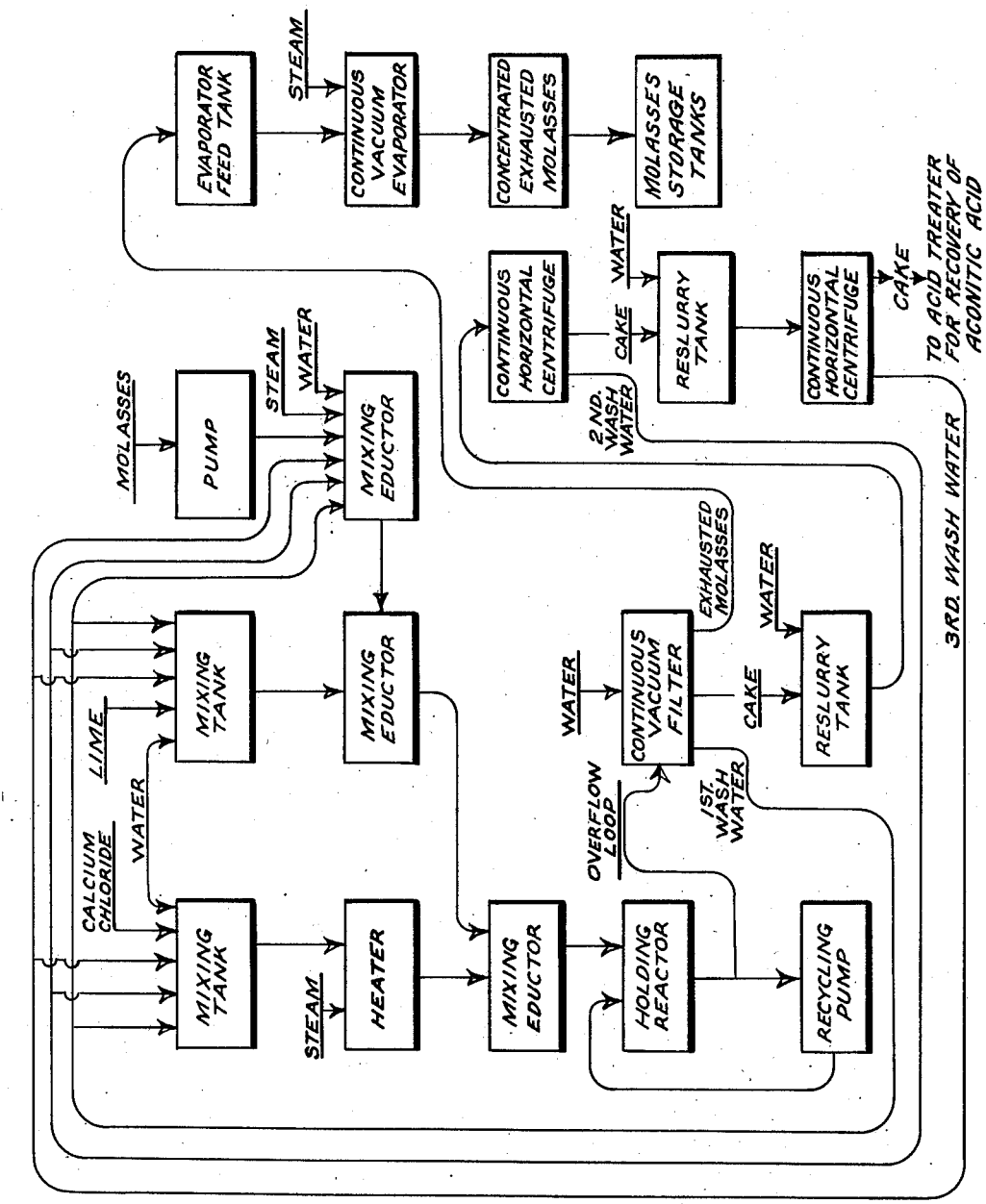

RECOVERY OF CALCIUM MAGNESIUM ACONITATE FROM MOLASSES

Robert E. Miller, East Lansdowne, Pa., assignor to The American Sugar Refining Company, New York, N. Y., a corporation of New Jersey Application August 12, 1950, Serial No. 179,065

4 Claims. (Cl. 260—527)

This invention relates to an improved process for the precipitation of insoluble alkaline earth aconitates from molasses, and more particularly from blackstrap molasses.

The precipitation of alkaline earth aconitates from sorghum juice and molasses, particularly B molasses, is described in U. S. Patents 2,280,085, 2,359,537, 2,469,090 and 2,481,557.

The present invention provides an improved process of treating molasses, and particularly blackstrap molasses and other molasses with a high aconitic acid content, and a high ratio of aconitic acid to calcium.

Some blackstrap molasses require merely dilution to around 50° Brix and heating to around 90° C. for about one hour to precipitate most of the aconitic acid content of the molasses as calcium magnesium aconitate. Molasses with a high aconitic acid content and a high ratio of calcium to aconitic acid, such as various Cuban molasses, respond to this treatment.

Other types of molasses, such as various molasses from Louisiana, have a low ratio of calcium to aconitic acid, with a high aconitic acid content, and with such molasses, dilution and heating is not sufficient.

I have found that a high yield of aconitic acid in the form of insoluble alkaline earth aconitates can be recovered from such molasses, and that the time required for recovering such aconitates can be materially shortened by adding lime and calcium chloride in regulated proportions to the diluted blackstrap or other molasses, and also adding fresh seed crystals to such molasses, and heating the diluted molasses with such additions to a temperature of around 90° C. for a period of one to two hours.

The amount of lime added to the diluted molasses is sufficient to raise the pH value to approximately 7.0. The amount of calcium chloride added is advantageously an amount which will bring the total ratio of calcium to aconitic acid to at least about 100% and advantageously a higher proportion of around 150%. To determine the amount of calcium chloride required, it is desirable to perform a test with two different levels or amounts of added calcium chloride to determine the most efficient or economical calcium level; for example, 100% of the theoretical amount of calcium and 150% of the theoretical calcium ion. 100% theoretical calcium represents 1 equivalent of calcium per equivalent of aconitic acid, based on the total calcium content of the reaction mixture and calculated on the basis of the amount of calcium required to form tricalcium aconitate.

Such preliminary tests can readily be carried out by diluting the blackstrap molasses to 50–55° Brix, adding an approximately 10% calcium oxide slurry in amount sufficient to give a pH value of approximately 7.0, adding the calcium chloride to the required extent in the form of a 15–30% calcium chloride solution (by weight), and adding approximately 5% of seed crystals (by weight) from a prior precipitation operation, with the molasses in which they are suspended. The reaction mixture is heated at 90° C. for from 1–2 hours, and after filtration or centrifugation the residual aconitic acid in the discharged molasses is determined.

The precipitation yield is improved markedly by seeding the diluted molasses with freshly precipitated aconitate such as a previously processed final reaction mixture of molasses and calcium magnesium aconitate. In general, laboratory investigations indicate that the more seeding used, the better the yield for a given heating time up to 2 hours. On the pilot plant scale, with proper equipment, the seeding is advantageously accomplished by recycling approximately 5% of the reaction mixture and relying upon diffusion and intermixture of this recycled portion for seeding the new molasses.

An advantageous method of carrying out the process is to use a large reservoir of sufficient size to allow adequate holding time of from 1–2 hours while feeding the adjusted raw material (containing added lime and calcium chloride) and withdrawing finished reaction mixture for separation at the desired flow rate, while recycling 5% of the final mixture and admixing it with the feed flowing to the reservoir. In this way, the feed of molasses to which lime and calcium chloride have been added is immediately admixed with molasses containing seed crystals.

The crude precipitate of alkaline earth aconitates formed by the heating and precipitation is separated from the molasses by a centrifuge or a filter. The resulting wet cake is washed by forming it into a slurry with 3 parts of hot water (70–90° C.) per part of wet cake, and again centrifuging or filtering; and this washing process is repeated two or three times until practically all of the supernatant molasses has been removed from the cake. The wash waters can be recycled and used for diluting fresh amounts of molasses to conserve the aconitate removed during the washing procedure.

The washed cake is advantageously used for the recovery of aconitic acid therefrom as by the treatment with sulphuric acid of companion application Ser. No. 179,052, filed August 12, 1950, The molasses from which the alkaline earth aconitate has been precipitated, after removing the precipitate by centrifuging or filtering, can be evaporated and reconcentrated to a blackstrap molasses similar to that treated except for the removal of the greater part of the aconitic content thereof and small amounts of other materials.

It is one advantage of the present process that it enables a high yield of aconitate to be recovered from blackstrap molasses, leaving a relatively small proportion of the aconitic acid in the treated molasses.

The invention is illustrated in a somewhat conventional and diagrammatic manner in the flow sheet of the accompanying drawing, which shows the blackstrap molasses being pumped to a mixing eductor to which water is supplied for diluting the molasses and steam for heating it. The diluted molasses goes from the first mixing eductor to a second mixing eductor to which a suspension of lime is supplied from a lime mixing tank. The molasses then goes to the third mixing eductor where the calcium chloride solution is added. The calcium chloride is supplied, together with water, to a mixing tank and is then passed through a heater heated by steam before mixing with the heated molasses in the third mixing eductor. The amount of lime added will be sufficient to raise the pH value of the molasses to around 7.0 and the amount of calcium chloride added will be sufficient to give a total amount of calcium ion equivalent to the aconitic acid content of the molasses or in excess thereof, such as 150%.

From the last mixing eductor the molasses goes to a holding reactor to which seed crystal is recycled by the recycling pump. The molasses is held in the holding reactor at a temperature of around 90° C. for from 1–2 hours on the average. A portion of the molasses leaving the reactor is recycled to provide seed crystals in the reactor for the freshly added molasses.

From the holding reactor, the slurry overflows to a continuous vacuum filter where the precipitate of calcium magnesium aconitate is removed and from which the exhausted molasses passes to an evaporator feed tank and then to a continuous vacuum evaporator heated by steam to give a concentrated exhausted molasses ready for sale and having much the properties of the initial blackstrap molasses except for the removal of a large proportion of the aconitates therefrom.

The filter cake on the continuous vacuum filter is washed with water, and the first wash water returned to the calcium chloride mixing tank or to the lime mixing tank or to the first mixing eductor for dilution of the blackstrap molasses.

The washed cake is reslurried with water in a reslurry tank and passes to a continuous horizontal centrifuge, the second wash water from the centrifuge is similarly returned to the mixing tanks or the first mixing eductor, and the cake is again reslurried with water and again centrifuged and the third wash water similarly returned, giving the washed cake which, as indicated in the flow sheet, may go to an acid treater for recovery of aconitic acid.

The series of operations illustrated in the flow sheet gives a high yield of alkaline earth aconitate and a molasses product freed from the greater portion of its aconitate content.

The invention will be further illustrated by the following specific examples, but it will be understood that the invention is not limited thereto.

*Example 1*

The molasses treated was Louisiana molasses (Evan Hall) of 74.0° Brix containing 5.3% aconitic acid and 0.17% calcium. 1000 parts of this molasses, containing 53 parts (0.92 equivalents) of free and combined aconitic acid and 1.7 parts of calcium (0.08 equivalents), were diluted by mixing with 396 parts of water. To the diluted molasses was added 4.01 parts of lime (0.20 equivalents) to adjust the pH value to 7.0; and 50.7 parts of anhydrous calcium chloride (0.91 equivalents) was added in the form of a 25% solution. There was also added 80 parts of a previous batch which had been heated with stirring at 85–95° C. for 2 hours, to supply seed crystals. The reaction mixture contained 1.25 equivalents of calcium and 0.97 equivalents of aconitic acid; or 1.29 equivalents of calcium per equivalent of aconitic acid. The reaction mixture was heated rapidly to 90° C. for 1 hour with continuous agitation to precipitate the complex calcium magnesium aconitate. After this time of heating, the removal of the precipitate by centrifuging or filtering gave approximately 130 parts of a crude wet precipitate containing an amount of alkaline earth salts of aconitic acid equivalent to 27.6 parts of aconitic acid, or a recovery of 49%. The diluted molasses, after centrifuging or filtering of the precipitate, contained residual dissolved aconitates equivalent to 28.7 parts of aconitic acid.

Instead of discontinuing the heating and agitation after 1 hour, the continuation of the heating and agitation of the reaction mixture for a period of 2 hours at a temperature between 85 and 95° C. resulted in a greatly increased precipitation and yield of aconitate. The precipitates removed by the centrifuge or filter in this case contained the equivalent of 34.9 parts of aconitic acid, representing a recovery of 62%.

The continuation of the reaction time to 3 hours before removing the precipitated aconitates increased the precipitated aconitates to an equivalent of 36.0 parts of aconitic acid, or a recovery of 64%.

*Example 2*

The process was carried out with the same molasses and by the same procedure of Example 1, except that a somewhat increased amount of calcium chloride was added, amounting to 77.1 parts per thousand parts of molasses or 1.39 equivalents, and with a return of 80 parts of a previous batch containing the precipitated aconitate to provide seed crystals. The mixture in this case contained 1.75 equivalents of calcium and 0.97 equivalents of aconitic acid; or 1.80 equivalents of calcium per equivalent of aconitic acid. The mixture was heated rapidly to 90° C. and maintained within the range of 85–95° C. with continuous agitation for 1 hour to precipitate the complex calcium magnesium aconitate. The mixture was then centrifuged and gave approximately 180 parts of a crude wet precipitate containing an amount of alkaline earth salts of aconitic acid equivalent to 38 parts of aconitic acid, or a recovery of 68%. The diluted molasses discharged from the centrifuge contained residual soluble aconitates equivalent to 18.3 parts of aconitic acid.

By holding the reaction mixture at a temperature of 85–95° for 2 hours before centrifuging, 74% of the original aconitic acid was removed as precipitated aconitates. By extending the reaction time to 3 hours, 76% of the original aconitic acid can be recovered as aconitates.

In the above examples, the procedure was much the some except for the difference in amount of calcium chloride added, being approximately 1.29 equivalents of calcium per equivalent of aconitic acid in Example 1, and 1.80 equivalents of calcium per equivalent of aconitic acid in Example 2. While a high yield of aconitate was obtained, by prolonged heating, even without the addition of seed crystals, where such a proportion of calcium chloride is added and such a ratio of calcium to aconitic acid is present, the time of heating can be very materially reduced and a high yield of aconitate nevertheless obtained when seed crystals are added together with the proper amount of lime and calcium chloride.

While the invention has been more particularly described in connection with blackstrap molasses, it is also applicable to other molasses such as B molasses and Sorghum molasses having a high equivalent ratio of aconitic acid to calcium.

I claim:

1. The process of treating molasses with a high equivalent ratio of aconitic acid to calcium which comprises treating the molasses at a dilution of around 50° Brix by adding lime to give a pH of around 7.0, adding calcium chloride to give a total equivalent ratio of calcium to aconitic acid in the molasses in excess of 1 to 1, adding a small amount of freshly precipitated seed crystals of calcium magnesium aconitate produced by the process to the molasses, heating the molasses at a temperature around 90° C. for a period of 1 to 2 hours to precipitate alkaline earth aconitates therefrom, and separating the precipitated aconitates from the molasses.

2. The process of treating blackstrap molasses with a high equivalent ratio of aconitic acid to calcium which comprises diluting the molasses to around 50° Brix, adding lime to give a pH of around 7.0, adding calcium chloride to give a total equivalent ratio of calcium to aconitic acid in the molasses in excess of 1 to 1, adding a small amount of freshly precipitated seed crystals of calcium magnesium aconitate produced by the process to the molasses, heating the molasses at a temperature around 90° C. for a period of 1 to 2 hours to precipitate alkaline earth aconitates therefrom, and separating the precipitated aconitates from the molasses.

3. The continuous process of treating molasses with a high equivalent ratio of aconitic acid to calcium for the continuous production and separation of aconitates therefrom which comprises continuously feeding such molasses, diluted to around 50° Brix and treated with lime to give a pH of around 7.0 and with added calcium chloride to give a total equivalent ratio of calcium to aconitic acid in the molasses in excess of 1 to 1, and which molasses is heated to a temperature around 90° C., to a large reservoir of sufficient size to allow the molasses to remain therein for a period of from 1 to 2 hours, maintaining the molasses in said reservoir at a temperature around 90° C. for a period of 1 to 2 hours to produce and precipitate alkaline earth aconitates therefrom, continuously withdrawing a small portion of the final reaction mixture containing precipitated aconitates from said reservoir and recycling it and continuously admixing it with the hot molasses fed to said reservoir, continuously withdrawing from said reservoir an amount of the final mixture corresponding to the molasses fed thereto, and separating the precipitated aconitates from the molasses.

4. The continuous process of treating blackstrap molasses with a high ratio of aconitic acid to calcium for the separating of alkaline earth aconitates therefrom which comprises treating the molasses at a dilution of around 50° Brix with lime to give a pH of around 7.0, adding calcium chloride to give a total equivalent ratio of calcium to aconitic acid in the molasses in excess of 1 to 1, continuously feeding the molasses so treated and heated to a temperature around 90° C. and admixed with a small portion of the order of 5% of the final reaction mixture containing precipitated aconitates, to a large reservoir of sufficient size to allow the molasses to remain therein for a period of from 1 to 2 hours, maintaining the molasses therein at a temperature around 90° C. for a period of 1 to 2 hours to effect formation and precipitation of alkaline earth aconitates therefrom, continuously withdrawing a small portion of the hot final reaction mixture containing aconitates produced by this treatment and recycling it and mixing it continuously with the hot molasses entering the reservoir, continuously withdrawing from the reservoir the final mixture in amount corresponding to the amount of molasses supplied thereto and separating the precipitated aconitates from the molasses.

ROBERT E. MILLER.

References Cited in the file of this patent

UNITED STATES PATENTS

| Number | Name | Date |
|---|---|---|
| 2,359,537 | Ventre et al. | Oct. 3, 1944 |
| 2,481,557 | Ambler et al. | Sept. 13, 1949 |
| 2,513,287 | Collier | July 4, 1950 |
| 2,517,601 | Shafor et al. | Aug. 8, 1950 |

OTHER REFERENCES

Lassar-Cohn, "Manual of Org. Chem." (Macmillan), p. 11 (1896).

Gatterman, "Practical Methods of Org. Chem." (Tr. by Schober et al., 3rd ed.), p. 8 (1923).